(12) United States Patent
Taylor et al.

(10) Patent No.: US 7,127,536 B2
(45) Date of Patent: Oct. 24, 2006

(54) SOURCE-SYNCHRONOUS RECEIVER HAVING A PREDETERMINED DATA RECEIVE TIME

(75) Inventors: Gary L. Taylor, Windsor, CO (US); Carson D. Henrion, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 799 days.

(21) Appl. No.: 10/262,006

(22) Filed: Sep. 30, 2002

(65) Prior Publication Data

US 2004/0062323 A1 Apr. 1, 2004

(51) Int. Cl.
*G06F 3/00* (2006.01)
*H03K 9/00* (2006.01)
*H04L 7/00* (2006.01)

(52) U.S. Cl. ............................. 710/58; 710/5; 710/36; 710/52; 375/316; 375/354

(58) Field of Classification Search ................. 710/36, 710/52, 61, 58; 375/316, 354
See application file for complete search history.

(56) References Cited

U.S. PATENT DOCUMENTS

| 4,945,548 | A | 7/1990 | Iannarone et al. | 375/4 |
| 6,529,570 | B1 * | 3/2003 | Miller et al. | 375/354 |
| 2002/0154718 | A1 * | 10/2002 | Fong et al. | 375/354 |
| 2004/0047441 | A1 * | 3/2004 | Gauthier et al. | 375/376 |

FOREIGN PATENT DOCUMENTS

| EP | 1 150 450 A2 | 10/2001 |
| EP | 1 150 451 A2 | 10/2001 |

* cited by examiner

*Primary Examiner*—Tammara Peyton
*Assistant Examiner*—Alan S. Chen

(57) ABSTRACT

A source-synchronous data receiver includes a storage device for sequentially storing data received from a data source, a data output device for sequentially outputting the data that is stored in the storage device, and a control for controlling the data output device, so that the data output device makes available particular data previously stored by the data storage device a programmable predetermined number of clock states after data is called for, e.g., a read command to the data source is initiated.

11 Claims, 2 Drawing Sheets

SOURCE-SYNCHRONOUS RECEIVER HAVING A PREDETERMINED DATA RECEIVE TIME

FIELD OF INVENTION

The present invention generally relates to source-synchronous receivers, and more particularly to a source-synchronous receiver that receives data that has been output from a data source and makes that data available for use a fixed number of clock states after the data was called for, e.g., by the initiation of a read command.

BACKGROUND

Conventional source-synchronous receivers receive input data synchronously with an input clock. A separate output clock provides the signals required for outputting the received data. Such a source synchronous receiver may be implemented using a circular FIFO queue that includes a number of data registers for holding the received data. An input pointer, advanced by an input clock, steers the data received from the bus to the proper register, e.g., first data is directed to go into a first register, second data into a second register, and so on. A multiplexer is connected to the data storage device and sends data from a selected data register at the proper time to an output latch. The multiplexer and the output latch typically receive their signals from the same output clock. The input clock signal, however, often has a varying phase and frequency relationship with respect to the output clock.

Progressively higher clock frequencies used in processors and on busses have placed greater demands on source-synchronous receivers to accommodate longer delays, up to several clock states or periods, and wider ranges of variations in clock instantaneous frequency and phase shift. The same amount of time delay encompasses more clock states at higher frequencies than at lower frequencies. Thus, the average overall delay in the system will depend on the system frequency and configuration. Short-term phase and frequency variations also occur. These variations must also be accommodated or compensated for in order to maintain a predictable or constant data availability time. In other words, the elapsed time or the number of clock states from the time data is called for to the time when that particular data is made available at the output of the source synchronous receiver should be a predictable system behavior in spite of frequency and phase variations that occur between the time that data is called for and the time that the called-for data is present at the input of the source synchronous receiver.

SUMMARY OF THE INVENTION

In accordance with an embodiment of the present invention, a source-synchronous data receiver includes a storage device for sequentially storing data received from a data source, a data output device for sequentially outputting the data that is stored in the storage device, and a control for controlling the data output device, so that the data output device makes available particular data previously stored by the data storage device a programmable predetermined number of clock states after data is called for, e.g., a read command to the data source is initiated.

DETAILED DESCRIPTION

Figure 1:
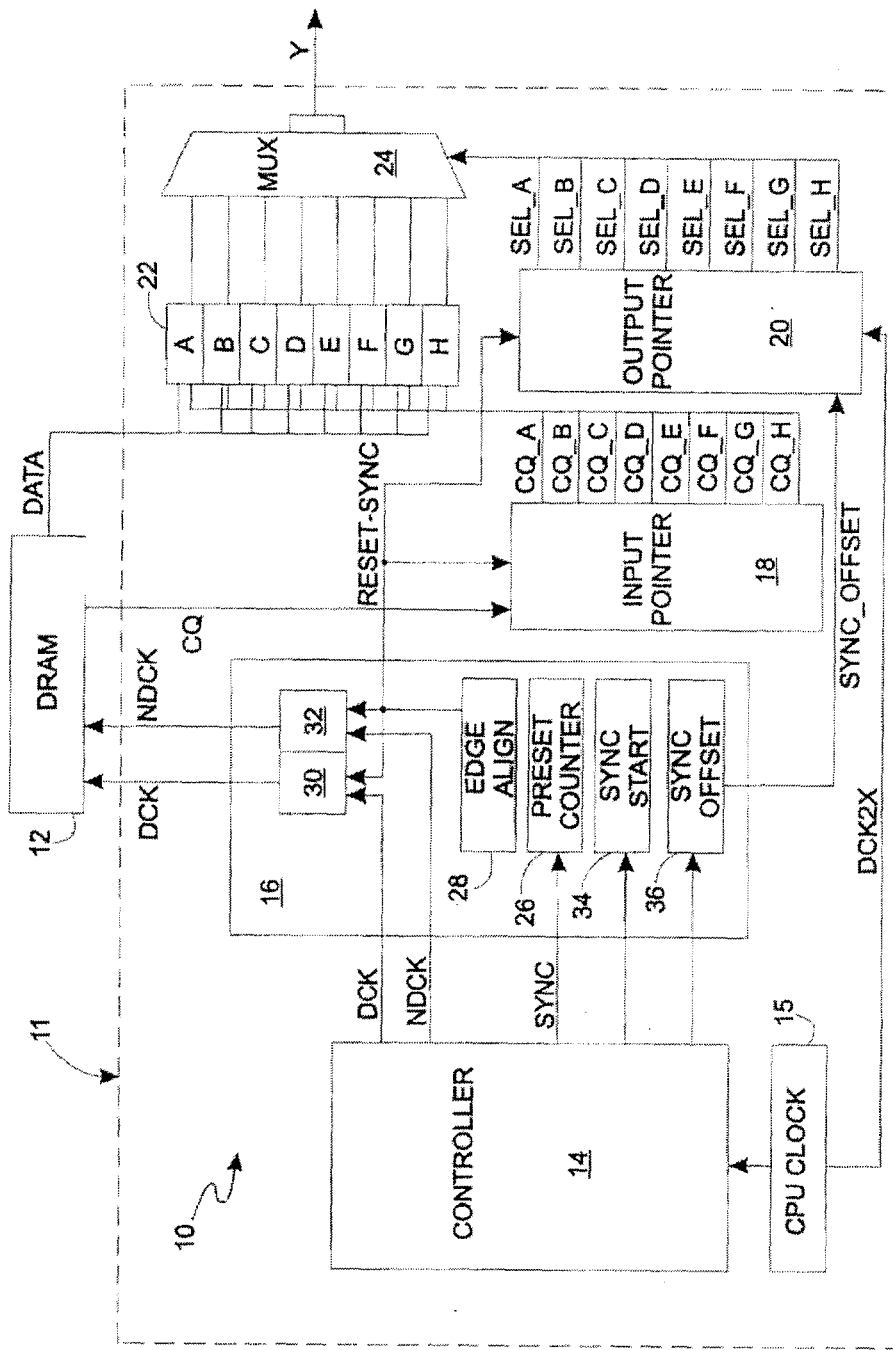
FIG. 1 is a block diagram of a source-synchronous receiver in accordance with an embodiment of the present invention; and, FIG. 2A through FIG. 2J are waveforms depicting input and output signals that occur at various locations in the block diagram of FIG. 1.

Referring to FIG. 1, a source-synchronous receiver in accordance with an embodiment of the present invention, indicated generally at 10, receives data from a dynamic random access memory (DRAM) 12. Receiver 10 may be implemented in a central processing unit (CPU) 11 and includes a controller 14 for sending various control signals to a synchronization (sync) circuit 16. There are many other functional devices within CPU 11 that are not shown, e.g. cache memory, other registers and counters, bus drivers, etc. Only the devices central to the present invention are illustrated.

The control signals generated by controller 14 include a synchronization signal (SYNC), a data clock signal (DCK) and the complement of the data clock signal (NDCK). Sync circuit 16, which will be described in more detail below, controls the passage of the DCK and NDCK signals to DRAM 12, and generates a RESET_SYNC signal (See FIG. 2A) that is provided to an input pointer 18 and an output device comprising an output pointer 20 and a multiplexer (MUX) 24. A storage device 22 comprises individually accessible addressable registers A–H. Input pointer 18 provides signals to storage device 22 to address or steer data received from DRAM 12 to one of the registers A–H. Output pointer 20 provides signals to multiplexer MUX 24 connected to the registers of storage device 22 to control MUX 24 to address or select one of the registers A–H and output the data stored therein.

Sync circuit 16 includes a preset counter 26, an edge aligning circuit 28 and a pair of gates or latches 30, 32. The SYNC signal, which occurs only at power-up or upon reboot, resets preset counter 26, which counts a predetermined number of CPU clock cycles, as determined by a programmable synchronization start controller 34. During the predetermined number of CPU clock cycles that are being counted by preset counter 26, the gates or latches 30 and 32 block the DCK (FIG. 2C) and NDCK clock signals from going to DRAM 12.

When the preset count ends, preset counter 26 outputs a signal to an edge align circuit 28 causing it to terminate the RESET_SYNC signal to the gates 30, 32 to allow the DCK and NDCK clock signals to pass to DRAM 12. During the preset count period, the DCK clock signal is held high and the NDCK clock signal is held low so that the DCK clock signal will transition from high to low and the NDCK clock signal will transition from low to high at the end of the preset count period. The DCK and NDCK clock signals are output by DRAM 12 as CQ and NCQ (not shown) clock signals after a delay resulting from the signals propagating through the circuitry of DRAM 12. The overall delay depends on many factors, including propagation delay from controller 14 through gates 30, 32 to DRAM 12, conditions in DRAM 12 such as, for example, manufacturing variation of the dimensions of field effect transistors (FETs) and conductive traces and the resulting variations in inductive and capacitive effects. The operating temperature and voltage of DRAM 12 will also affect the length of the delay. The CQ clock signal from DRAM 12 that is provided to input pointer 18 will experience additional delays on the clock bus between DRAM 12 input pointer 18. Similarly, data from DRAM 12 will experience delays on the data bus between DRAM 12 and storage device 22.

The RESET_SYNC signal that is output from edge align circuit 28 is also provided to input pointer 18 and output pointer 20. Input pointer 18 has a plurality of outputs, CQ_A through CQ_H. Output pointer 20 has an equal plurality of outputs, SEL_A through SEL_H. Input pointer 18 receives and is advanced by the CQ clock signal from DRAM 12. Output pointer 20 receives and is advanced by clock signal DCK2X from CPU clock 15. The DCK2X clock signal has a frequency twice the frequency of the DCK clock signal. In a preferred embodiment, the input pointer 18 is implemented using latches and advances on every edge (rising and falling) of the CQ clock signal, while the output pointer 20 is implemented using flip-flops and advances on every complete cycle (i.e., only on the rising edge or only on the falling edge) of the DCK2X clock signal.

Both input pointer 18 and output pointer 20 are implemented with a "one hot" scheme in which only one output transitions high at a time. That is, as each pointer is advanced by its respective clock signal, each output in a predetermined order will transition from low to high as it is selected and then return to low as the next output is selected or promptly thereafter. The order is circular so that after the last output is selected, output H in the illustrated embodiment, the next output selected will be the first output of the pointer, output A in the illustrated embodiment.

The RESET_SYNC signal from sync circuit 16 resets input pointer 18 so that a predetermined output, CQ_A to CQ_H, is selected (becomes high). In the preferred embodiment, this is output CQ_A. Similarly, the RESET_SYNC signal also resets output pointer 20 so that one of its outputs, SEL_A through SEL_H, is selected (becomes high). In the preferred embodiment, this selection is made by a sync offset controller 36, which generates a SYNC_OFFSET signal to output pointer 20. Sync offset controller 36 may be a register in the sync circuit 16, which in turn is controlled by controller 14. When the RESET_SYNC signal from the sync circuit 16 and the SYNC_OFFSET signal from sync offset controller 36 are received by output pointer 20, the selected output, SEL_A–SEL_H, transitions high, sending a select signal to MUX 24.

Because of the various delays mentioned above, the DCK clock signal from controller 14, and even more so, the CQ clock signal returning from DRAM 12, will be delayed with respect to the DCK2X clock signal from CPU clock 15. Thus, from the time a read command is initiated at a particular transition of the DCK2X clock signal until the called-for data is presented at a register A–H of storage device 22 along with the CQ clock signal, output pointer 20 could have received (and have been advanced by) several states of the DCK2X clock signal.

In operation, and referring to FIGS. 2A–2J, when the leading edge of the RESET_SYNC signal from sync circuit 16 is received by input pointer 18, input pointer 18 is reset so that output CQ_A transitions high. At the end of the preset count period the RESET_SYNC signal transitions low. The output CQ_A remains high until the CQ clock signal falls and then rises again. On the fall of the CQ clock signal, however, the next output in the sequence, CQ_B, transitions high. Thus, as the preset count period ends, output CQ_A is outputting a high (logic 1). On the next fall of the CQ clock signal, output CQ_B transitions to high. On the next rise of the CQ clock signal, output CQ_A transitions to low. Similarly, on the next fall of the CQ clock signal, output CQ_C (not shown) will transition high, and on the next rise of the CQ clock signal, output CQ_B will transition low. This sequence will continue in a circular manner through all of the outputs of input pointer 18.

The RESET_SYNC signal is also received by output pointer 20, which in combination with the SYNC_OFFSET signal, causes a selected output of output pointer 20 to transition high. The particular output selected is determined by the SYNC_OFFSET signal from sync offset controller 36, which is in turn controlled by controller 14. This selection is made on the basis of the delay in the DCK signal from controller 14 to DRAM 12, the internal delay in DRAM 12, and the further delay in the CQ clock signal from DRAM 12 to input pointer 18, and the variations in these delays. In other words, the selected output or starting position of output pointer 20 is offset by a number of clock cycles greater than the maximum predicted delay in order to ensure that the data (if any) in the appropriate register A–H of storage device 22 is present when the output pointer 20 causes MUX 24 to select and output data from that register. It will be appreciated that the minimum offset can be zero, that is, the output pointer 20 can be caused to select the same register that has been selected by the input pointer. The maximum offset is equal to one less than the total number of data registers in storage device 22. In the illustrative example where storage device 22 has eight data registers, the maximum offset is seven. This would be the case where in response to the reset signal, input pointer 18 selects output CQ_A, pointing to register A, and output pointer 20 selects output SEL_B, pointing to register B.

Suppose that the total delay does not exceed six cycles of the DCK2X clock signal. In this case, in the exemplary embodiment, controller 14 may be programmed to cause offset controller 36 to output a SYNC_OFFSET SIGNAL THAT selects output SEL_C of output pointer 20 to transition high when the RESET_SYNC signal is received. When the RESET_SYNC signal ends, advances of the outputs, SEL_A–SEL_H, of output pointer 20 are controlled by the DCK2X clock signal. At each complete cycle of the DCK2X clock signal, the next output in the sequence will transition high and the currently selected output will transition low. As noted earlier, the pointers are of the "one hot" rotating type.

When the output SEL_A of output pointer 20 transitions high, MUX 24 selects the data (if any) stored in register A of storage device 22 and makes it available at output Y. In the illustrative example, the data (if any) in register A was stored there in response to output CQ_A of input pointer 18 steering data from DRAM 12 into register A during or before the sixth previous cycle of the DCK2X clock signal. By this time (i.e., six DCK2X clock cycles after the end of the RESET_SYNC signal), output CQ_B of input pointer 18 will transition high, steering the next data (if any) from DRAM 12 to be stored in register B of storage device 22.

The input pointer 18 advances its selected outputs sequentially in response to the CQ clock signal, which is substantially coincident on the clock bus from DRAM 12 with data on the data bus from DRAM 12. Thus, even though the CQ clock signal may vary in phase and instantaneous frequency, it will reliably strobe its associated data into the appropriate register A–H pointed to by input pointer 18. Output pointer 20, on the other hand, is advanced by the DCK2X clock signal, which is very closely related in phase and instantaneous frequency to the system clock. Thus, so long as data has previously been stored in the register A–H that is being selected by output pointer 20, that data will be made available at output Y consistently and predictably a predetermined number of cycles of the system clock after that data is called for from DRAM 12.

If conditions change so that the total delay decreases to less than was predicted and programmed for in sync offset circuit 36, then a greater number of registers A–H will hold data in advance of the time that it is to be made available at output Y. On the other hand, if the total delay increases to an amount greater than programmed for in sync offset circuit 36, then output pointer 20 would attempt to read data from a register before that data had been received and stored in that register.

Figure 2:
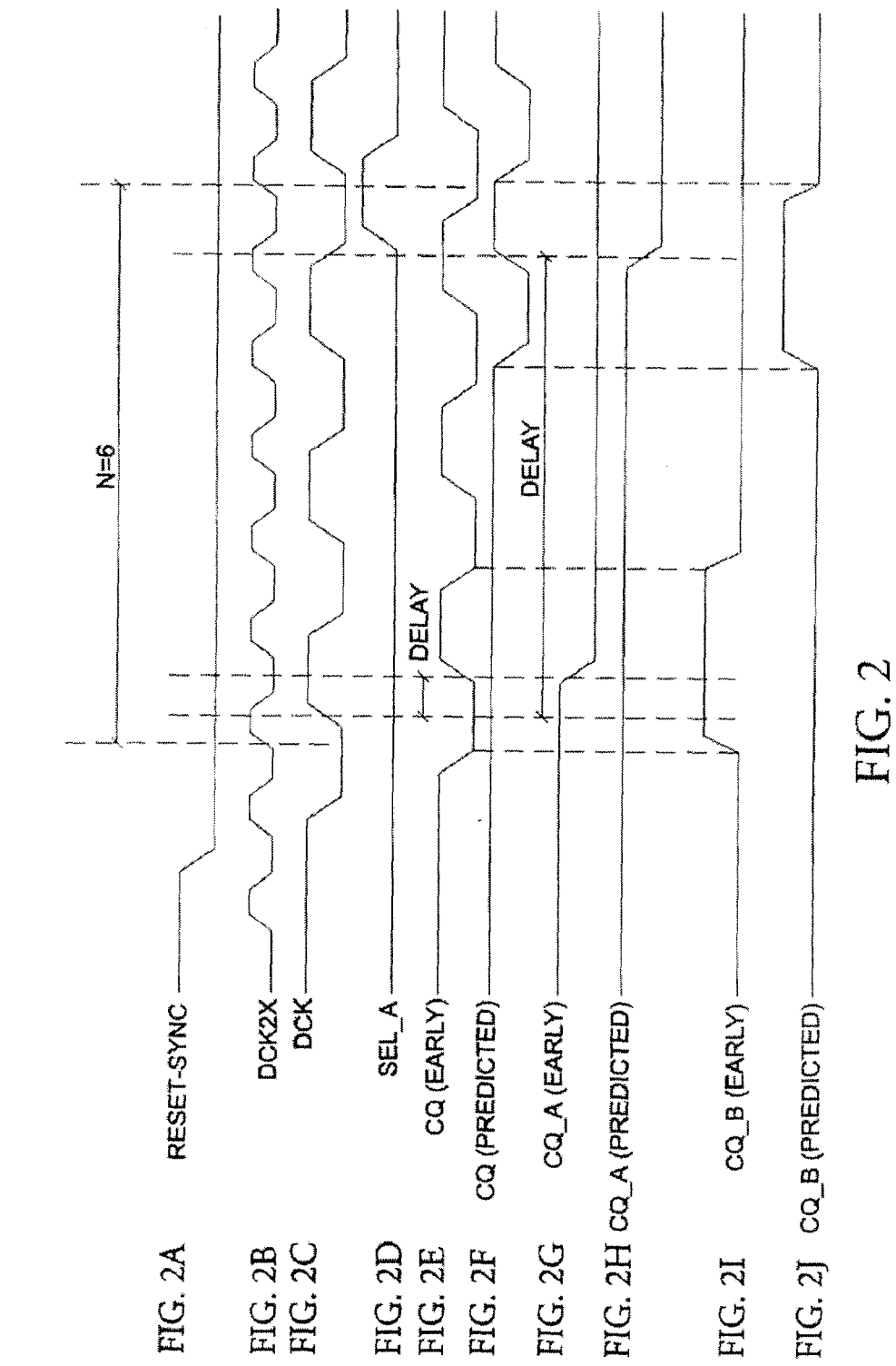

FIG. 2 demonstrates two operating conditions for the illustrative embodiment, one identified as EARLY and one identified as PREDICTED. Referring first to FIG. 2F, there is shown a waveform identified as CQ (PREDICTED). CQ (PREDICTED) and the data associated therewith experience the amount of delay that had been predicted and arrive at input pointer 18 and storage device 22, which in the illustrative example is less than six cycles of the DCK2X clock signal after initiation of the read command to DRAM 12 for that data. It will be recalled that CQ_A transitioned high and remained there following receipt of the RESET_SYNC signal by input pointer 18. Thus, when the called-for data and CQ (PREDICTED) arrive at input pointer 18 and storage device 22, output CQ_A of input pointer 18 is high, as illustrated in FIG. 2H and identified as CQ_A (PREDICTED), causing the called-for data to be loaded in register A. As described earlier, and as shown in FIG. 2J, output CQ_B, identified here as CQ_B (PREDICTED) transitions high on the fall of CQ (PREDICTED), pointing to register B to receive the subsequent data (if any) called for at the next cycle of the DCK2X clock signal following the read command for the data loaded into register A.

During the six cycles of the DCK2X clock signal referred to above, the selected output, SEL_A–SEL_H, of output pointer 20 will be advanced from SEL_C, which was initially selected by the RESET_SYNC signal and the SYNC_OFFSET signal, to SEL_A in response to the DCK2X clock signal. Thus, during the sixth cycle of the DCK2X clock signal, the called-for data that has just been loaded into register A is made available at output Y.

Consider now the situation where the programmed delay is still six cycles, but the actual delay in the arrival of the CQ clock signal and its associated data at input pointer 18 and storage device 20 is very short, e.g., less than a full cycle of the DCK2X clock signal. This situation is illustrated by FIG. 2E and the waveform identified as CQ (EARLY). As in the earlier situation where the actual delay is the predicted delay, CQ_A transitioned high and remained there following receipt of the RESET_SYNC signal by input pointer 18. Thus, when the called-for data and CQ (EARLY) arrive at input pointer 18 and storage device 22, output CQ_A of input pointer 18 is high, as illustrated in FIG. 2G and identified as CQ_A (EARLY), causing the called-for data to be loaded in register A. As shown in FIG. 2I, output CQ_B, identified here as CQ_B (EARLY) transitions high on the fall of CQ (EARLY), pointing to register B to receive the subsequent data (if any) called for at the next cycle of the DCK2X clock signal following the read command for the data loaded into register A.

Unlike the situation of the actual delay matching the predicted delay, the output pointer does not promptly point to register A and make the data stored there available at output Y. To the contrary, the selected output of output pointer 20 will have advanced only from SEL_C to SEL_D. Five more cycles of the DCK2X clock signal will occur before output pointer 20 is pointing to register A. In the meantime, subsequent data (if any) called for from DRAM 12 will be loaded into registers B, C, D, etc., so that each data will be available six clock cycles of the DCK2X clock signal after its respective read command was initiated.

Thus, during the sixth cycle of the DCK2X clock signal following the initiation of a read command to read data from DRAM 12, the called-for data is made available at output Y, regardless of whether the actual delay is substantially the same as the programmed delay, or whether the actual delay is sorter than the programmed delay.

It should be understood that the delay of six DCK2X clock cycles was used only as an example and that sync offset control 36 can be programmed for a greater or lesser delay. For example, the output at SEL_A could be delayed by rour DCK2X clock cycles from the time RESET_SYNC signal ends, in which case, output pointer 20 would initially output a high signal at output SEL_E. Accordingly, at the time output pointer 20 outputs a high signal from output SEL_A to cause MUX 24 to retrieve data from latch A, the buffer 22 would have data (if any) stored in register A. This, however, is contingent upon input pointer 18 receiving the delayed CQ signal from the DRAM 12 within the programmed four DCK2X clock cycles.

It will be seen that the offset programmed into output pointer 20 by the sync offset controller 36 determines how soon data will be attempted to be retrieved from storage device 22 after that data is called for from DRAM 12. A smaller offset or number of clock states results in quicker data retrieval from the storage device 22, but also creates a possibility that data may not arrive at and be available in the storage device 22 for retrieval. On the other hand, a greater offset programmed in output pointer 20 by the sync offset controller 36 will ensure availability of data in the selected register of storage device 22 at the time of retrieval, but will also result in later data retrieval. Through the use of programmable delay and offset, apparatus embodying the present invention may be advantageously used in many environments encompassing a wide range of average delay and variable delay, and may be re-programmed to compensate for modifications made to the system wherein the apparatus is used that cause the average delay and/or variable delay to change.

While various embodiments of the present invention have been shown and described, it should be understood that modifications, substitutions and alternatives may be made by one of ordinary skill in the art and that such modifications, substitutions and alternatives are intended to within the scope of the appended claims.

What is claimed is:

1. A source-synchronous data receiver having a constant data receive time for receiving data from a data source which receives a master clock signal from said data receiver and has a variable data output delay, said receiver comprising:
   means for storing data received from the data source;
   means for selectively outputting data stored in said data storing means; and,
   controlling means for holding the master clock signal to the data source for a predetermined period to halt a signal from the data source for enabling said data storing means to store data from the data source, and generating a reset signal after said predetermined period to release said master clock signal, reset said data storing means to store data from the data source, and reset said data outputting means to output particular data stored by said data storing means a predetermined number of clock states after said data storing means has been reset to store said particular data.

2. The receiver as defined in claim 1 wherein,
   said data storing means includes a buffer for storing data received from the data source and a first pointer for directing data from the data source to a plurality of locations in said buffer;
   said data outputting means includes a multiplexer and a second pointer for selecting data in said buffer to be output by said multiplexer; and,
   said controlling means resets said first pointer to direct said particular data from the data source to a first predetermined one of said locations in said buffer, and said second pointer to select a second one of said predetermined location for outputting data by said data outputting means, when said reset signal for resetting said first and second pointers is received from said controlling means, so that said second pointer selects said first predetermined location in said buffer said predetermined number of clock states after said data storing means has been reset to store said particular data.

3. The receiver as defined in claim 2 wherein said first pointer includes a plurality of outputs corresponding to said predetermined number of locations in said buffer, and data from the data source is stored in one of said locations in said buffer corresponding to one of said outputs of said first pointer when said one of said outputs sends a signal to said buffer.

4. The receiver as defined in claim 3 wherein said first pointer sends a signal from a predetermined one of said outputs when said reset signal for resetting said first pointer is received from said controlling means, and subsequently, sends a signal from each of said outputs in a predetermined order, including said predetermined one of said outputs, each time said signal output by the data source is received by said first pointer.

5. The receiver as defined in claim 4 wherein said signal output by the data source is the master clock signal delayed by said predetermined period.

6. The receiver as defined in claim 4 wherein said second pointer includes a plurality of outputs corresponding to said predetermined number of locations in said buffer, and said multiplexer outputs data stored in one of said locations in said buffer corresponding to one of said outputs of said second pointer, when said one of said outputs of said second pointer sends a signal to said multiplexer.

7. The receiver as defined in claim 6 wherein said second pointer outputs a signal from a predetermined one of said outputs when said reset signal for resetting said second pointer is received from said controlling means, and subsequently sends a signal from each of said outputs in a predetermined order, including said predetermined one of said outputs, each time a second clock signal is received by said second pointer.

8. The receiver as defined in claim 7 wherein said second pointer selects said first predetermined location in said buffer after said signal output by the data source has been received by said first pointer.

9. The receiver as defined in claim 7 wherein a frequency of said second clock signal is higher than a frequency of said signal output by the data source, and said first pointer and said second pointer output signals at the same frequency.

10. The receiver as defined in claim 2 wherein said controlling means includes:
at least one latch for holding the master clock signal for said predetermined time;
a counter for determining said predetermined time for holding the master clock signal; and,
an edge aligning circuit for aligning a first transition of the master clock signal when the master clock signal is output by said at least one latch at an end of said predetermined time, with a second transition of the master clock signal prior to being held in said at least one latch.

11. The receiver as defined in claim 10 wherein said predetermined time for holding master clock signal in said latch is determined by a programmable counter controller.

* * * * *